May 25, 1937.  O. W. HAHN  2,081,198
FILTER
Filed Nov. 27, 1933
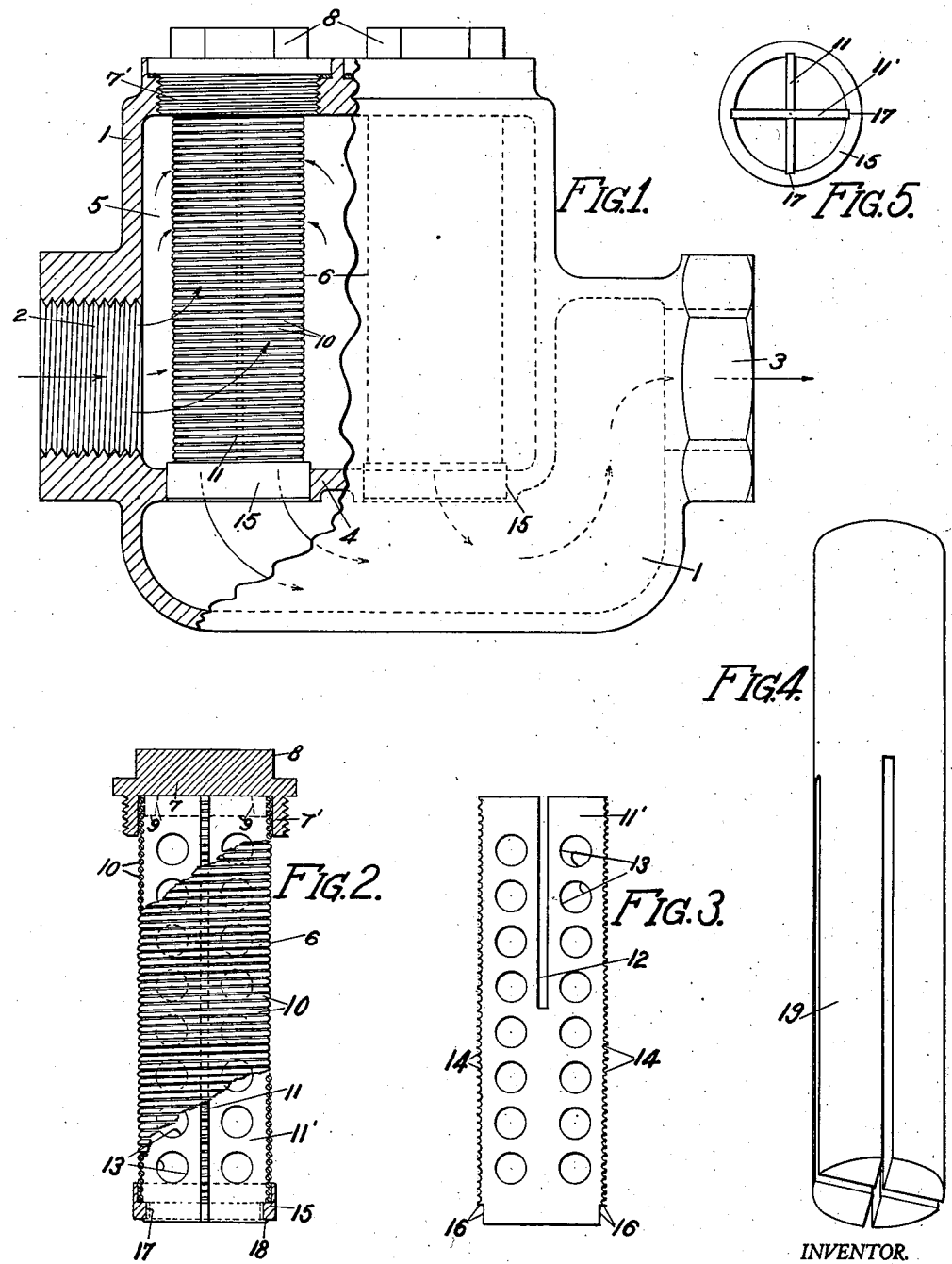
INVENTOR.
OTTO W. HAHN
BY Miller Boykin & Bird
ATTORNEYS.

Patented May 25, 1937

2,081,198

UNITED STATES PATENT OFFICE 2,081,198

FILTER

Otto W. Hahn, San Francisco, Calif.

Application November 27, 1933, Serial No. 699,912

3 Claims. (Cl. 210—169)

This invention relates to filters for filtering liquids generally, though it is equally useful for gases, and has for its objects an improved construction whereby a very large filtering area may be had in a compact space, and the width or sizes of the filtering interstices may be exactly predetermined and they will all be alike and the filter may be very easily cleaned. Other features and advantages of the invention will appear in the following description and accompanying drawing.

In the drawing 1 is an elevation partly in section of my improved filter with two filtering units therein.

Fig. 2 is a somewhat enlarged view partly in section of one of the filtering units.

Fig. 3 is a plan of one of the slotted plates which make up the spider inside of the unit.

Fig. 4 is a perspective view of a slotted mandrel on which the wire coiled wire filtering element may be placed to slip it over the spider.

Fig. 5 is a lathe center cap for the split end of the mandrel.

Briefly described, my invention comprises winding a wire in the form of a helix on a hollow spider or core exteriorly threaded so as to space the coils of the helix just the desired amount to form the filtering interstices. Thus if the wire used be $\frac{1}{32}$ of an inch in diameter and the threaded core have 31 threads per inch the space between the wires will be less than a thousandth of an inch, etc., thus it will be seen that with suitable gages of wire and selected number of threads per inch, any spacing from zero up may be obtained with great accuracy and the spacing will be uniform so that the filter will not quickly choke by material first gathering and building up on the finer interstices to gradually creep over the larger ones. Also such a filtering unit when blown out from within will at once release any and all accumulations formed on the outside from the filtering operation.

Such a filtering element may be of any size, or with any size or quality of wire, and any number may be mounted in one filter body, but in the drawing a filter is shown in which two such elements are mounted.

In the drawing, 1 is the hollow body of the filter formed with an inlet 2, an outlet 3 and a partition wall 4 separating the outlet from the main chamber 5 in which are positioned two of my helical wire filtering elements generally designated 6, and which comprises a head 7 with a circular neck 7' threaded into an opening in the top wall of chamber 5 and provided with a nut-like projection 8 for applying a wrench. This head is provided with a circular rib 9 concentrically disposed within the neck 7' so as to form a circular channel therebetween into which the wire helix 10 and its supporting spider 11 are tightly forced. The spider may be cast or otherwise formed with any number of radial arms upon which to receive the wire, but I prefer to make the spider out of two flat strips of heavy sheet metal 11 and 11' which are slotted half their length as at 12 in Fig. 3 so that they may be forced longitudinally tightly over one another to form the spider. These plates are also drilled as at 13 to freely pass liquid and they are threaded along their outer edges as at 14. The circular rib 9 is cross-slotted to receive the spider so that when forced into place it will always turn as a unit when turning nut 8.

The wire coil 10 is circular and is spaced and supported within the threads 14 of the spider, and at the outer end of the element is a metal flange 15 which fits snugly over the wire coil and seats in notches 16 in the ends of the spider and is itself notched or slotted through its outer thickened portion 17 to receive the crossed spider plates and hold them at right angles to one another. These plates 11 and 11' extend about $\frac{1}{32}$ of an inch beyond the outer end of ring 15 and are slightly peened at 18 to prevent the ring accidentally coming off. If desired, the assembled article may be spot-welded as various points in the larger size units.

The wire 10 may be hard bronze, nickel, stainless spring steel or whatever material will best resist any action which might be set up by the fluid being filtered, and this selection of metals or other materials also applies to the supporting structure of the units as well as to the body of the filter.

In winding the coils they may be wound with tight or closely touching coils on a mandrel slightly smaller than the bottoms of the spider threads 14, then slipped over a cross slotted mandrel 19 (Fig. 4) of a diameter slightly larger than the exterior of the spider threads, then this slotted mandrel is slipped into a spider (unattached to its head or end ring), the coil held with one hand and the slotted mandrel withdrawn, thus leaving the coil upon the spider under a tension depending on the size of the winding mandrel used. A rubbing of the outside of the coils will cause them to snap into the threaded edges of the spider, and after which the end ring 15 may be pushed on in a press, and the other end pushed into the tight fitting annular recess in the head. It is generally unnecessary to solder or otherwise secure the end of the spider and coil in the head as a press fit will more than suffice to hold it against any strain placed upon it.

When screwed in place in the filter body 1 the ring 15 at the inner end of the filtering element extends into a nicely fitting hole in partition wall 4 so that all flow of liquid must be from the inlet 2, first to chamber 5 and through the minute spaces between the coils, thence along the hollow spider and to the chamber 20 below the partition wall and thence to the outlet 3.

To clean the filter, the flow may be reversed for a few moments (where the installation permits) or either element may be unscrewed from the body and rinsed off, when the adhering matter will be found to release itself quicker than from any other filtering element or media with which I am familiar. If the wire of a character to permit, heat may be applied to burn off some types of matter or for sterilization purposes.

Having thus described my improved filter and some of its advantages, what I claim is:

1. A filtering element for fluids comprising a helix of wire, means arranged and adapted to space the adjacent coils of the helix and to rigidly support the helix against axial elongation and lateral distortion, said means comprising plates perpendicularly disposed relatively connected on the axis of the helix with the outer edges of the plates engaging the inner sides of the helix from end to end thereof.

2. A filtering element including a wire helix having spaced convolutions, means to support said convolutions against lateral and longitudinal displacement comprising a pair of plates extending from end to end of the helix and having threaded edges receiving the convolutions of the helix, said plates each having a slot extending from one end of the plate to its center and being interlocked with the unslotted portion of each plate fitting in the slot of the other plate, and a closure screwed onto the plates at one end of the unit.

3. A filtering element including a wire helix having spaced convolutions, means to support said convolutions against lateral and longitudinal displacement comprising a pair of plates extending from end to end of the helix and having threaded edges receiving the convolutions of the helix, said plates each having a slot extending from one end of the plate to its center and being interlocked with the unslotted portion of each plate fitting in the slot of the other plate, said plates dividing the interior of the helix into longitudinally extending compartments and being provided with openings affording communication between said compartments, and a closure screwed onto the plates at one end of the unit.

OTTO W. HAHN.